May 15, 1945. R. WIDMER 2,376,302
CINEMATOGRAPHIC PHOTOGRAPHING APPARATUS
Filed July 6, 1943
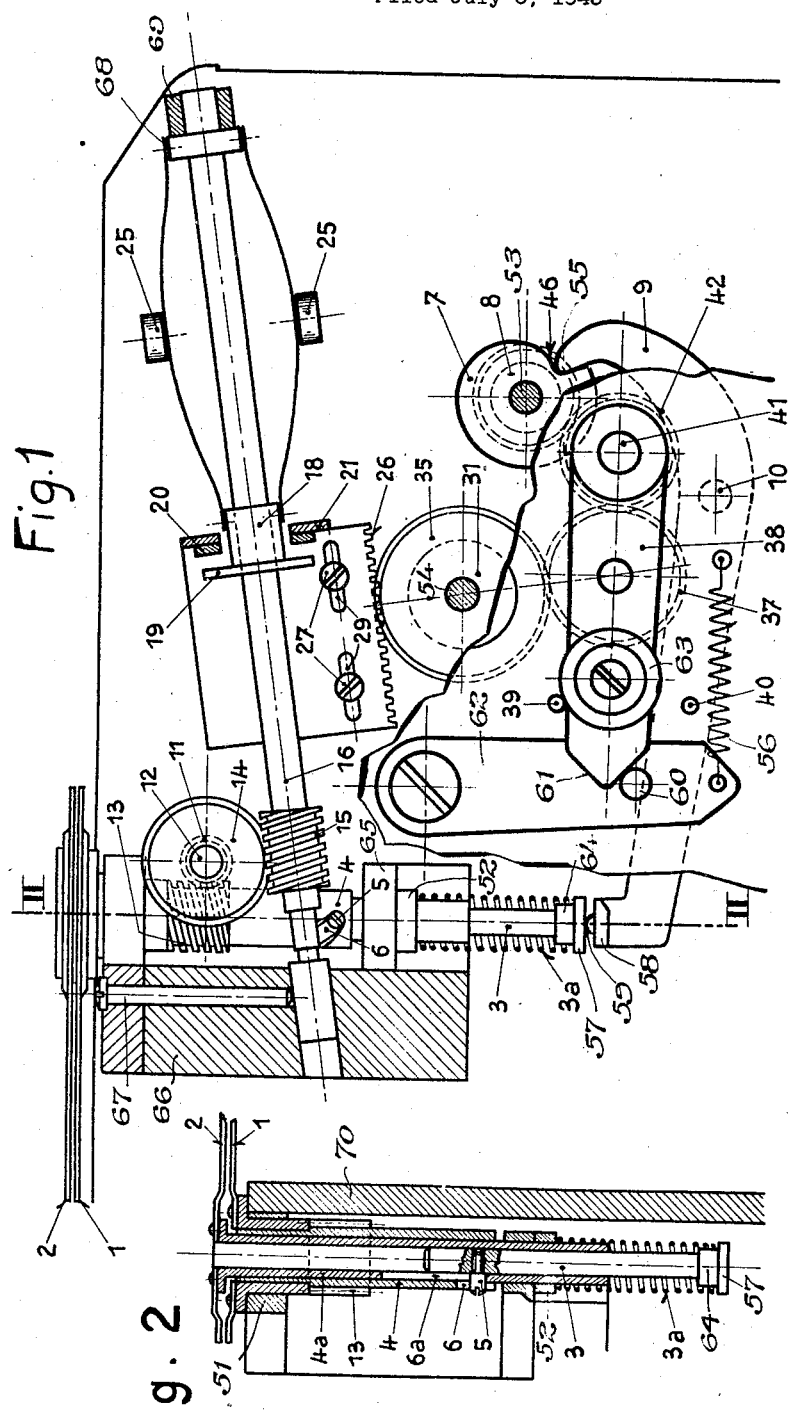
INVENTOR
RENE WIDMER,
BY
ATTORNEYS Patented May 15, 1945

2,376,302

UNITED STATES PATENT OFFICE 2,376,302

CINEMATOGRAPHIC PHOTOGRAPHING APPARATUS

René Widmer, Sainte-Croix, Switzerland, assignor to Paillard & Cie. S. A., Sainte-Croix, Switzerland, a corporation of Switzerland Application July 6, 1943, Serial No. 493,682
In Switzerland September 7, 1942

6 Claims. (Cl. 88—19.4)

Cinematographic photographing apparatus is in general provided with a speed governor which makes it possible to vary the speed of rotation of the shutter, which depends on that of feeding the film, that is to say the number of views taken in a unit of time.

This governor thus enables the number of views taken in a given time to be adapted to the speed of movement of the object in front of the objective or to the particular effects it is desired to obtain. This adjustment, however, has a disadvantage by reason of the fact that the greater the number of views taken in a unit of time, the smaller is the time of exposure when the shutter opening is of the same size.

Photographic limitations to produce desired density of negatives require that for a given kind of film, the shutter opening should be made larger when the time of exposure is shortened, so that substantially the same total quantity of light is applied to each frame, that is, the product of area of shutter opening and exposure period should be kept the same.

Some manufacturers have provided their photographing apparatus with a shutter of variable opening. These shutters make it possible to obtain progressive fading and vary the appearance of a scene. These shutters thus enable the time of exposure to be varied without modifying the speed of rotation of the shutter.

No photographing apparatus known up to the present time is provided with a device which enables the speed of rotation of the shutter to be varied without changing the exposure period.

The subject of the present invention is a cinematographic photographing apparatus provided with a shutter of adjustable aperture of which the opening and closing adjustment is actuated by a control member, this apparatus being also provided with a speed governor adjustable by an operating member adapted to enable the speed of rotation of the shutter to be adjusted.

This apparatus eliminates the disadvantage referred to above by the fact it has a mechanical connection operated manually, which, when in the operated position, produces a mechanical connection of the control member to the governor operating member in such a manner that a control action for the increase or decrease respectively of the speed of the mechanism driving the film automatically effects the control of an opening or closing respectively of the adjustable shutter.

A form of construction of a photographing apparatus particularly suited for amateur use is shown by way of example and diagrammatically in the accompanying drawing, wherein:

Fig. 1 shows a partial front view of a photographing apparatus of which the casing has been removed and of which some parts have been broken away and other parts are shown in section.

Fig. 2 is a view in partial section on the line II—II of Fig. 1.

Referring to the drawings and detail, the shutter with adjustable opening is formed of two blades 1 and 2 secured respectively to two sleeves 4a, 4, sliding one on the other and pivoted in two stationary bearings 51, 52. A shaft 3 slides inside the two sleeves.

A pin 5, carried by the shaft 3, passes through a straight slot 6a provided along a generating line of the inner sleeve 4a and engages with a helicoidal groove 6 provided in the outer sleeve 4. A longitudinal axial movement of the shaft 3 thus produces, by reason of the slots 6 and 6a, a relative angular movement of the blades 1 and 2 of the shutter. The pin 5 also causes the sleeve 4a to be rotated by the sleeve 4. The end of shaft 3 remote from the blades 1, 2, carries a terminal disc 57, and an expansion spring 3a acting between fixed bearing 52 and disc 57 keeps shaft 3 and pin 5 normally urged away from the blades.

A cam 7 with a progressive spiral profile is secured to a shaft 53 passing through the side wall of the apparatus. The end of the shaft emerging on the outside carries a rotary operating member or knob 8. This knob 8 enables the longitudinal axial movements of the shaft 3 to be effected manually through the medium of a lever 9 pivoted at 10. One end 55 of lever 9 is held in contact with the profile of the cam 7. The other end 58 of lever 9 carries a terminal button 59, and lever 9 is so mounted on its pivot 10 that button 59 is in position to be engaged by terminal disc 57 of shaft 3 as the latter is urged by spring 3a, while the other end 53 of lever 9 engages the profile of cam 7. As cam 7 is rotated, it pushes on end 55 of lever 9 and thereby pushes on terminal disc 57 and longitudinally displaces shaft 3 and pin 5. The angular position of this cam 7 determines the relative angular position of the blades, that is to say the opening of the adjustable shutter.

The rotational movement of the shutter is effected by a first helicoidal wheel or worm 11 secured to a shaft 12 driven by the feed mechanism of the film (not shown). This wheel 11 is in engagement with a second helicoidal wheel or worm 13 cut in the outer sleeve 4. The shaft 12 also carries a flange 14 engaging with a worm 15 secured to a shaft 16 carrying an adjustable speed governor. This governor is formed by flying weights 25, 25, secured to resilient arms. One of the ends of each of these arms is secured to a ring 18 freely mounted on the shaft 16. This ring 18 can slide along the shaft 16, and carries a plate 19 adapted to come into engagement with brake shoes 20 carried by a ring 21 secured to a rack 26 in mesh with a pinion 35 secured to a shaft 54 passing through the wall of the apparatus. This shaft 54 has secured to the end thereof emerging on the outside, a rotary operating member or knob 31. The rack 26 is guided by pins 27 engaging with its slots 29.

The knob or operating member 31 thus, by modifying the position of the brake shoe members of the governor, makes it possible to adjust the feeding speed of the film, and thus the speed of rotation of the shutter to be adjusted, which speeds are interdependent. In other words the position of the brake shoes 20 defines the number of "shots" effected in a unit of time.

A toothed wheel 37, pivoted on a lever 38 swinging between two stops 39, 40 about a fixed shaft 41, may be brought into engagement (position shown) with the pinion 35, or may be swung out of engagement therewith. The shaft 41 carries the toothed wheel 42 which gears with a toothed wheel 37 and with a toothed wheel 46 secured to the shaft 53 carrying the cam 7. Locking means are provided for locking or fixing the position of the lever 38 so that the toothed wheel 37 gears with or is disengaged from the toothed wheel 35.

When the lever 38 is in the position shown in the drawing, with gear 37 engaging gear 35, the knob or operating member 8 of the cam 7 and the knob or operating member 31 of the speed governor, are interlocked or connected together mechanically. Thus a rotation movement of the knob or member 8 produces simultaneously an angular adjusting movement of the blades of the shutter and also a variation in the speed of rotation of the shutter as a whole, that is to say, of the mechanism for feeding the film. This connection is provided in such a manner that an increase in its speed of rotation corresponds with a wider opening of the blades of the shutter. It is thus possible to retain approximately the same period of time for exposure during the talking of views at different speeds.

When the lever 38 is swung so as to be applied against the lower stop 40, the toothed wheels 35 and 37 are disengaged from one another in such a manner that the control of the opening of the shutter is independent of that of the speed of rotation thereof.

A form of construction of the subject of the present invention has been described by way of example and with reference to a particular type of shutter and speed governor, but it will be understood that my construction for coordination of the speed of rotation of a shutter to the width of opening of the shutter may be applied to all types of speed governors and adjustable shutters.

Having now particularly described and ascertained the nature of my said invention and in what manner the same is to be performed, I declare that what I claim is:

1. Cinematographic photographing apparatus including a variable shutter, actuating means for effecting the opening and closing of said shutter, film feeding means, an adjustable governor for controlling the speed of rotation of said shutter and said film feeding means, said governor comprising a shaft having a plurality of weights mounted on resilient strips, each of said strips having one of its ends fixedly secured to said shaft, the other end of said strips terminating in a collar member slidably mounted on said shaft, a brake shoe adapted to cooperate with said collar, means for adjusting the relative distance between said brake shoe and said collar, said last named means comprising a gear rack rigidly secured to said shoe and a pinion adapted to mesh with said gear rack, said gear rack being slidably mounted on said apparatus, a gear train, and means for engaging and disengaging said gear train with said pinion whereby when said gear train is in engaging position with said pinion said governor will control the opening or closing of said shutter and the speed of the film feeding means.

2. In film gate apparatus, a pair of rotatable supporting members, a shutter comprising a pair of blades respectively fixedly carried on said supporting members, positioning means for interconnecting said supporting members for rotation as a unit, displaceable adjusting means for adjusting said positioning means for varying the relative position of said supporting members and thereby adjusting the opening between said blades, a lever mounted pivotally with a first one of its ends engaging an end of said shaft, a control cam spindle, a cam carried on said spindle, said cam being mounted for engagement of its profile with the second end of said lever, a drive axle, gear means whereby said axle drives said supporting members, a governor connected for controlling the speed of said drive shaft and comprising a speed setting element, and interconnecting means comprising a gear train interconnecting said cam spindle and said setting element, whereby rotation of said cam shaft simultaneously adjusts the speed of said drive shaft and the opening of said shutter blades.

3. Film gate apparatus according to claim 2, and control means for selectively connecting said interconnecting means for simultaneous common adjustment of the speed of said drive shaft and the opening of said shutter blades, or for disconnecting said interconnecting means for independent separate adjustment of said speed and of said opening.

4. Film gate apparatus according to claim 2, said interconnecting means being adapted to increased the opening of said shutter blades as the speed of said drive shaft increases.

5. In film gate apparatus, a pair of co-axial sleeves, a shutter comprising a pair of blades respectively fixedly carried on said sleeves, a shaft mounted within the inner one of said sleeves and carrying a radial pin, said sleeves being provided with non-similar grooves adapted to receive said pin, a lever mounted pivotally with a first one of its ends engaging an end of said shaft, a control cam spindle, a cam carried on said spindle, said cam being mounted for engagement of its profile with the second end of said lever, a drive axle, gear means whereby said axle drives the outer of said sleeves, a centrifugal governor connected for controlling the speed of said drive shaft and comprising a speed setting element, and means comprising a gear train interconnecting said cam spindle and said setting element, whereby rotation of said cam shaft simultaneously adjusts the speed of said drive shaft and the opening of said shutter blades.

6. Film gate apparatus according to claim 5, said governor comprising a brake shoe and a rack member slidably carrying said brake shoe, and said gear train being engageable with said rack.

RENÉ WIDMER.